A. L. McGREGOR.
ADJUSTING MEANS FOR AUTOMOBILE BUFFERS.
APPLICATION FILED JUNE 19, 1914.
1,158,947.
Patented Nov. 2, 1915.
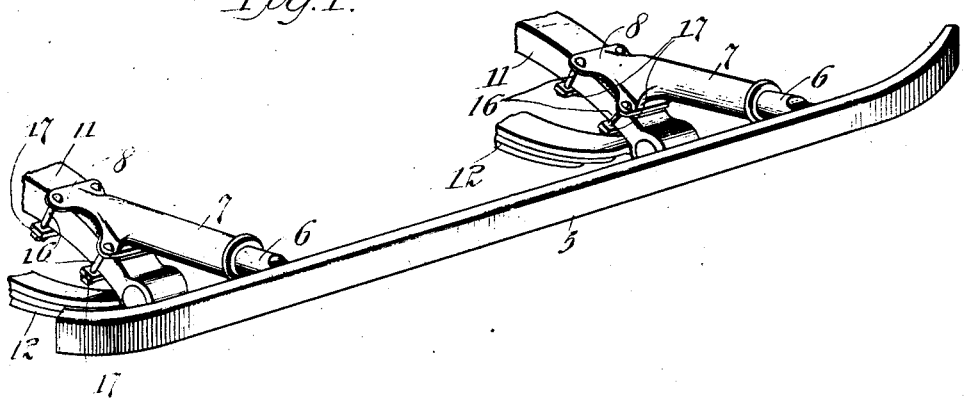
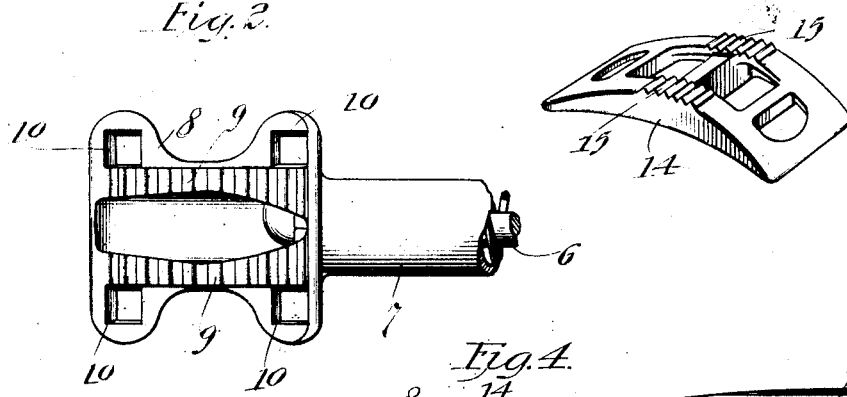
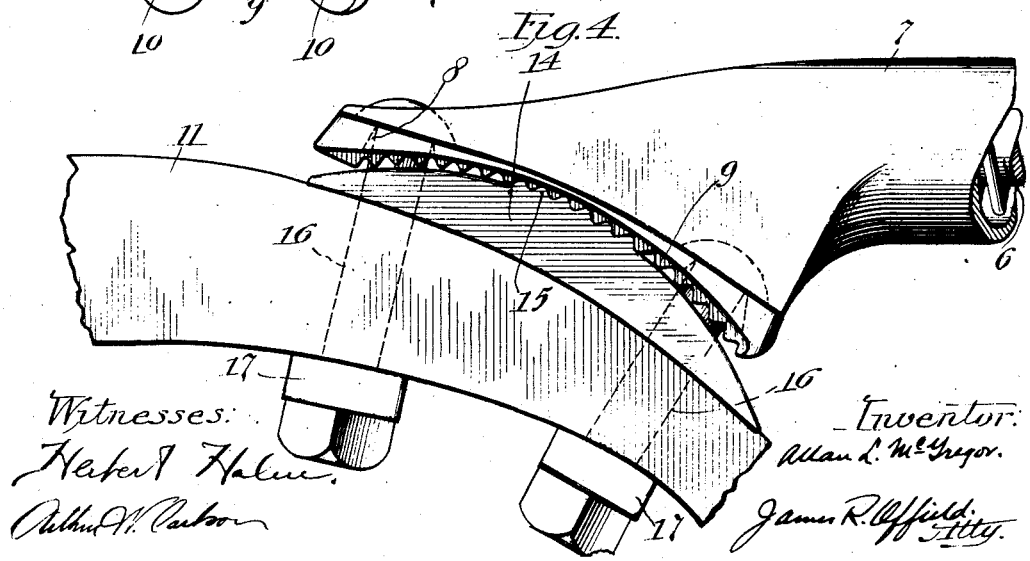
Witnesses:
Herbert Halm
Arthur W. Carlson
Inventor:
Allan L. McGregor
James R. Offield, Atty.

UNITED STATES PATENT OFFICE.

ALLAN L. McGREGOR, OF CHICAGO, ILLINOIS.

ADJUSTING MEANS FOR AUTOMOBILE-BUFFERS.

1,158,947. Specification of Letters Patent. Patented Nov. 2, 1915.

Application filed June 19, 1914. Serial No. 846,028.

*To all whom it may concern:*

Be it known that I, ALLAN L. McGREGOR, a citizen of the United States, residing at Chicago, in the county of Cook and State of Illinois, have invented certain new and useful Improvements in Adjusting Means for Automobile-Buffers, of which the following is a specification.

In the application of automobile buffers to the frame of a vehicle, it is desirable to have the supporting arms carrying the buffer bar to extend, as nearly as possible, in a horizontal plane. This not only adds to the appearance of the vehicle, but it brings the buffer bar in the proper position relative to the parts designed to be protected. It is necessary that the successful buffer be so designed that it may be readily attached to the frame of any make of vehicle of standard type, but considerable difficulty has been experienced in this respect for the reason that the ends of the side frames of vehicles of different make are not all of the same curvature, so that the buffer construction designed for one type of vehicle to bring the supporting arms on a horizontal plane, when applied to another vehicle, the supporting arms might be angularly disposed relative to the horizontal plane desired.

The principal object of my invention therefore, is to devise an automobile buffer capable of being so adjusted that it may be applied to any vehicle and the supporting arms arranged in a horizontal plane irrespective of the particular curvature that may be given to the ends of the frame of the vehicle.

In the accompanying drawing Figure 1 is a perspective view of my automobile buffer applied to the frame of a vehicle and showing my improved adjusting means. Fig. 2 is a bottom view of the toothed surface of one of the projecting arms. Fig. 3 is a perspective view of the toothed base plate interposed between the supporting member and the side frame. Fig. 4 is an enlarged detail view of my improved adjusting means, with parts broken away.

Referring now more particularly to the drawings, the buffer bar 5, is supported by two arms 6 having a telescopic engagement with the supporting members 7. Formed integral with the members 7 and at the rear end of each member are base plates 8, the under surface of each plate being curved and provided with teeth 9. Bolt receiving openings 10 are also formed at four corners of the base plates 8. The conventional form of frame for motor vehicles comprises two side frame members 11, the forward ends of which are curved downwardly for receiving the springs 12. It is customary to secure the supporting members 7 to the sides of the frame and unless the base plates 8 upon the supporting members are specially formed to fit a vehicle frame, having a certain curvature at the forward ends, the supporting members will not lie in a horizontal position as is desired. In order that my improved structure may be applied to vehicle frames having different degrees of curvature at the forward ends, I interpose the adjusting member 14 between the base plate 8 and the side frames 11, which adjusting members 14 are provided with teeth 15 for complementary engagement with the teeth 9.

In attaching my improved structure to the vehicle frame, the adjusting members 14 are placed in the proper position at the forward ends of the side frames 11 whereupon the toothed face of the base plate 8 is applied to the adjusting member 14 and adjusted so that the supporting member 7 lies in substantially a horizontal position. The other supporting member is then adjusted, whereupon bolts 16 are passed through the bolt receiving openings 10 and the lower ends of the bolts pass through suitable openings in the plates 17. Thus the supporting members are rigidly clamped to the forward ends of the frame by the further aid of suitable nuts engaging the threaded ends of the bolts 16.

It is of course, obvious that the plates 8 need not be formed integral with the supporting members 7 and that various other means may be employed besides teeth for preventing the sliding movement between the base plates 8 and the intermediate adjusting members 14.

Without therefore limiting my invention to such details which are herein shown only as the preferred embodiment of the invention, I claim—

1. In an automobile buffer, in combination, a buffer bar, a supporting member for said bar having a curved base plate, a vehicle frame having a curved forward end, a curved adjusting member, means for preventing slipping of the base plate relative to said adjusting member and means for securing said supporting member to said frame and for holding said curved base plate against said adjusting member.

2. In an automobile buffer, in combination, a buffer bar, a supporting member for said bar having a curved base plate, projections on the under side of said base plate, a vehicle frame having a curved forward end, a curved adjusting member adapted to be interposed between said base plate and vehicle frame, projections on the upper surface of said adjusting member and means for securing said supporting member to said frame and for holding said base plate and adjusting member in interlocked position.

ALLAN L. McGREGOR.

Witnesses:
    SADIE M. RYAN,
    AIRS HERNIMAN.